United States Patent
Huang et al.

(10) Patent No.: US 12,490,328 B2
(45) Date of Patent: Dec. 2, 2025

(54) SYSTEMS AND METHODS FOR BUFFER-BASED NEW RADIO DUAL CONNECTIVITY SETUP

(71) Applicant: Verizon Patent and Licensing Inc., Basking Ridge, NJ (US)

(72) Inventors: Wei David Huang, Danville, CA (US); Vishwanath Ramamurthi, San Ramon, CA (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 444 days.

(21) Appl. No.: 18/298,002

(22) Filed: Apr. 10, 2023

(65) Prior Publication Data
US 2024/0340985 A1     Oct. 10, 2024

(51) Int. Cl.
*H04W 76/15*     (2018.01)
*H04W 28/02*     (2009.01)

(52) U.S. Cl.
CPC ....... *H04W 76/15* (2018.02); *H04W 28/0278* (2013.01)

(58) Field of Classification Search
None
See application file for complete search history.

(56) References Cited

U.S. PATENT DOCUMENTS

| | | | |
|---|---|---|---|
| 11,272,560 B1* | 3/2022 | Vivanco | H04W 28/20 |
| 2022/0167449 A1* | 5/2022 | Wang | H04L 5/0098 |
| 2023/0371103 A1* | 11/2023 | Oak | H04W 28/086 |

\* cited by examiner

*Primary Examiner* — Kouroush Mohebbi (57) ABSTRACT

In some implementations, a device may transmit a buffer monitoring request message, wherein the buffer monitoring request message indicates a threshold time. The device may receive a buffer monitoring response message, wherein the buffer monitoring response message indicates one or more data radio bearers (DRBs) having buffers that exceed a data threshold for a time longer than the threshold time, and wherein the buffer monitoring response message indicates respective buffer sizes. The device may receive a measurement report of a user equipment (UE) associated with a buffer size among the respective buffer sizes, wherein the measurement report is associated with secondary node (SN) candidates. The device may establish, based on the measurement report, a New Radio dual connectivity (NR-DC) for the UE by adding an SN from the SN candidates.

20 Claims, 7 Drawing Sheets

SYSTEMS AND METHODS FOR BUFFER-BASED NEW RADIO DUAL CONNECTIVITY SETUP

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications. "Downlink" (or "DL") refers to a communication link from the network node to the UE, and "uplink" (or "UL") refers to a communication link from the UE to the network node.

DETAILED DESCRIPTION OF EXAMPLE EMBODIMENTS

The following detailed description of example implementations refers to the accompanying drawings. The same reference numbers in different drawings may identify the same or similar elements.

In New Radio (NR) dual connectivity (NR-DC), a user equipment (UE) may be connected to two nodes (e.g., network nodes) at the same time. With NR-DC, the UE may be able to transmit and/or receive information via two different nodes. The two nodes may be connected to each other via a backhaul link. The two nodes may include a master node (MN) (or primary node) and a secondary node (SN). With NR-DC, the UE may be provided with more resources to achieve a higher throughput, as compared to an NR single connectivity. In NR single connectivity, the UE may only be connected to a single node. Further, NR-DC may also provide increased robustness during UE mobility and handover.

When the UE is only connected to a single node, adding the SN may trigger multiple signaling procedures. When the UE is connected to the MN and the SN in accordance with NR-DC, changing the SN may trigger multiple signaling procedures. The multiple signaling procedures may involve a significant amount of information exchanges among various network nodes or elements, such as the UE, a distributed unit (DU), a central unit (CU) control plane (CU-CP), a central unit user plane (CU-UP), and/or a core network. Such information exchanges may strain limited network capacity, as well as drain UE battery power. With NR-DC, the UE may need to maintain two connections, associated with the two nodes, which may involve consuming additional battery power as compared to only maintaining a single connection.

However, NR-DC may not always significantly improve the quality of experience (QoE) over NR single connectivity. In some cases, NR single connectivity may provide a similar QoE as compared to NR-DC, even though the UE may be consuming more network resources and draining additional battery by operating with NR-DC. In such cases, the UE may be better suited to operate using NR single connectivity despite the availability of NR-DC. However, the UE may often be configured with NR-DC as a default, based on the UE supporting NR-DC, and the UE may not have a mechanism to intelligently switch between NR single connectivity and NR-DC. As a result, in some cases, the UE may unnecessarily over-consume network resources and use excess battery power when operating with NR-DC with no or minimal QoE improvement.

In some implementations described herein, a device, such as an MN, may transmit a buffer monitoring request message. For example, an MN CU-CP may transmit the buffer monitoring request message to an MN CU-UP. The buffer monitoring request message may indicate a threshold time, such as a time-to-trigger (TTT). The device, in response, may receive a buffer monitoring response message. For example, the MN CU-CP may receive the buffer monitoring response message from the MN CU-UP. The buffer monitoring response message may indicate one or more data radio bearers (DRBs) having buffers that exceed a data threshold for a time longer than the threshold time. The buffer monitoring response message may also indicate respective buffer sizes. The buffers may include downlink buffers or uplink buffers. The device may also receive a measurement report of a UE associated with a largest buffer size among the respective buffer sizes received. The measurement report may be associated with SN candidates for an SN addition. The device may establish, based on the measurement report, an NR-DC for the UE by adding an SN from the SN candidates. Thus, a buffer status may be an indication of a potential upcoming QoE deterioration, where the potential upcoming QoE deterioration may be related to a delay longer than allowed in a quality of service (QOS) policy.

In some implementations, the buffer status may be used as a precursory indicator of potential upcoming QoE deterioration, such as a delay longer than allowed in a quality of service (QOS) policy. The buffer status may be used as a key performance indicator (KPI) trigger to set up the NR-DC. The buffer status may be associated with buffers in both directions (e.g., an uplink buffer and a downlink buffer). The buffer status may be based on traffic in an uplink direction or in a downlink direction. Thus, a downlink-buffer-based NR-DC setup and/or an uplink-buffer-based NR-DC setup may be supported based on a traffic-based SN addition.

In some implementations, to optimize the use of UE energy and network capacity utilization, an operator may ensure that the NR-DC will enhance QoE sufficiently for the UE. To help UE battery saving and network capacity optimization, a standalone network such as a fifth generation (5G) network may set up the NR-DC to improve QoE only when certain criteria are satisfied, which may balance the greater battery usage and network resource consumption associated with the NR-DC. When the certain criteria are not satisfied, the UE may operate using NR single connectivity, which may be associated with reduced battery usage and network resource consumption.

Figure 1:
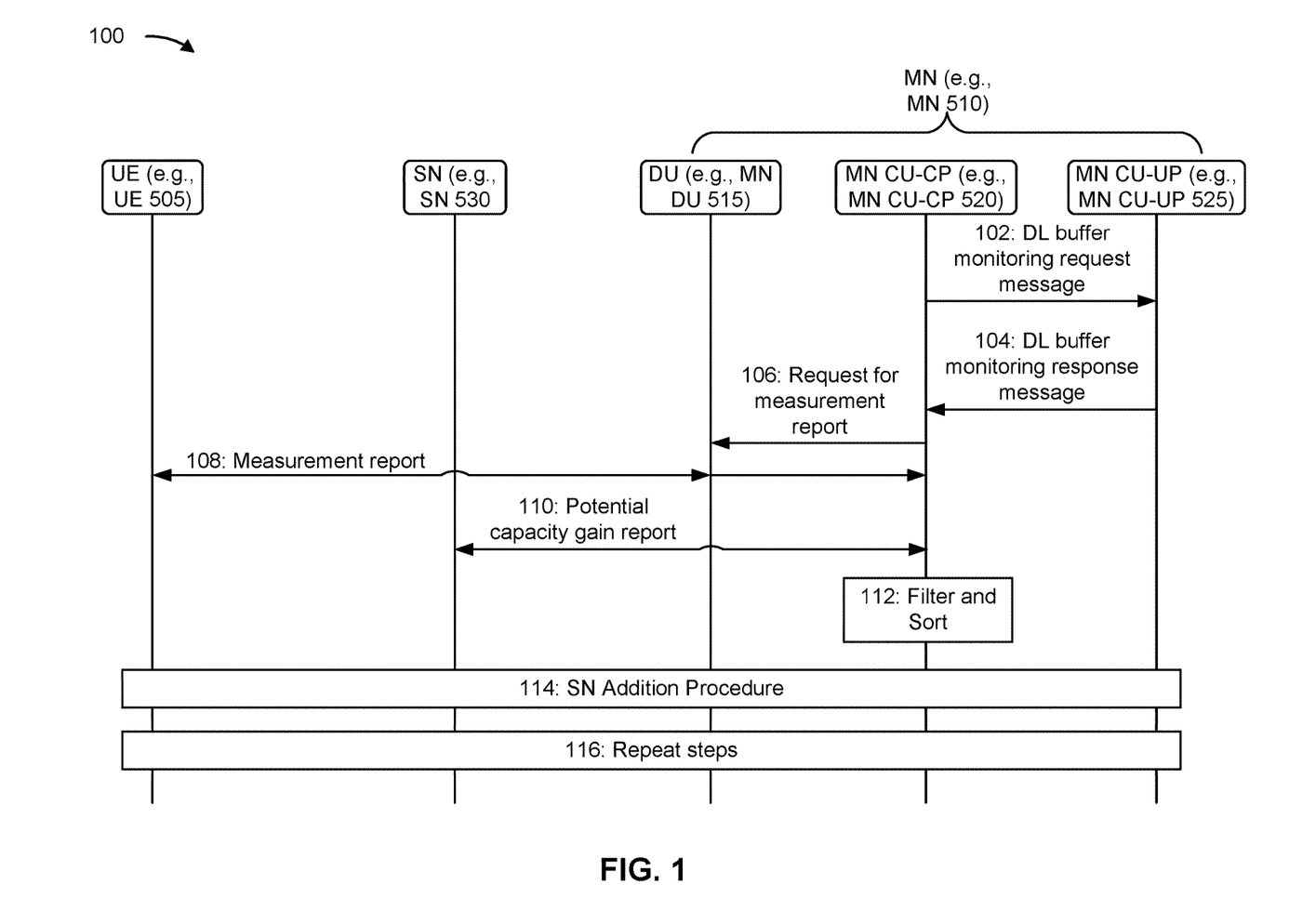
FIG. 1 is a diagram of an example associated with a buffer-based New Radio dual connectivity (NR-DC) setup.

FIG. 1 is a diagram of an example 100 associated with a buffer-based NR-DC setup. As shown in FIG. 1, example 100 includes a UE (e.g., UE 505), an MN (e.g., MN 510), and an SN (e.g., SN 530). The MN may include an MN DU (e.g., MN DU 515), an MN CU-CP (e.g., MN CU-CP 520), and an MN CU-UP (e.g., MN CU-UP 525).

In some implementations, a downlink-buffer-based NR-DC setup may be supported, which may involve an air interface and next generation (NG) radio access network (RAN) interfaces, such as Xn, F1, and E1 interfaces. For the downlink-buffer-based NR-DC setup, a downlink buffer may reside within the MN CU-CP. The downlink buffer may reside at a packet data convergence protocol (PDCP) layer within the MN CU-UP.

As shown by reference number 102, the MN CU-CP may transmit a downlink buffer monitoring request message to the MN CU-UP. The downlink buffer monitoring request message may be transmitted via an E1 interface or any other similar interface. The downlink buffer monitoring request message may be transmitted to request a monitoring of the downlink buffer status of DRBs without NR-DC. In other words, the downlink buffer monitoring request message may indicate the request for the monitoring of the downlink buffer status of the one or more DRBs, and the monitoring may be without the NR-DC. The downlink buffer may reside within the MN CU-UP, such that the MN CU-UP may be able to monitor the downlink buffer status. The downlink buffer monitoring request message may indicate various parameters, such as a downlink buffer threshold, a TTT (or TTT timer or threshold time), and/or a periodic/trigger-based response request.

As shown by reference number 104, the MN CU-UP may transmit, to the MN CU-CP, a downlink buffer monitoring response message via the interface. The MN CU-UP may respond to the MN CU-CP as configured (periodically or trigger-based) with the downlink buffer monitoring response message to acknowledge the downlink buffer monitoring request message, and then the MN CU-UP may start to monitor NR-DC candidates. The downlink buffer monitoring response message may indicate one or more DRBs whose downlink buffers have exceeded a data threshold for a time longer than the TTT. The downlink buffer monitoring response message may indicate respective downlink buffer sizes of the downlink buffers.

As shown by reference number 106, the MN CU-CP may rank a plurality of UEs by downlink buffer sizes, based on the one or more DRBs indicated in the downlink buffer monitoring response message. The MN CU-CP may identify the UE, of the plurality of UEs, with a largest downlink buffer size, among the downlink buffer sizes. In other words, the MN CU-CP may rank the UE, among the plurality of UEs, based on the UE being associated with the largest downlink buffer size among the downlink buffer sizes. The MN CU-CP may transmit a request to the MN DU (e.g., a serving DU) for the UE to transmit a measurement report on potential candidates for SN addition (SN candidates). The MN CU-CP may transmit the request for the measurement report to the UE based on the ranking of the UE. The MN CU-CP may transmit, to the MN DU, the request for the measurement report of the UE associated with the largest downlink buffer size among the respective downlink buffer sizes.

As shown by reference number 108, the UE with the largest downlink buffer size may trigger the measurement report on SN candidates for SN addition, which may be based on the request from the MN DU and the MN CU-CP. The UE may transmit the measurement report to the MN DU. The MN DU may forward the measurement report to the MN CU-CP. The MN CU-CP may receive, from the UE, the measurement report, where the measurement report may be associated with the SN candidates for the SN addition.

As shown by reference number 110, the MN CU-CP may request the SN, which may be one of the SN candidates, to report a potential capacity gain of the SN, should the SN be added. The MN CU-CP may transmit the request to the SN via the Xn interface. In other words, the MN CU-UP may transmit, to the SN candidates, a request for a report regarding a potential capacity gain resulting from adding each of the SN candidates. The SN, based on the request received from the MN CU-CP, may transmit an indication of the potential capacity gain to the MN CU-CP.

As shown by reference number 112, the MN CU-CP may filter out the SN candidates using a defined signal threshold. The MN CU-CP may sort qualified SN candidates based on reported potential capacity gains. Based on the filtering and sorting, the MN CU-CP may select the SN. In other words, the MN CU-CP may select the SN from the SN candidates based on the potential capacity gain associated with the SN, where the SN may be a top-ranked SN from the SN candidates in terms of potential capacity gain.

As shown by reference number 114, the MN CU-CP may set up the NR-DC with the SN, which may correspond to the top-ranked SN candidate with a highest potential capacity gain. The MN CU-CP may set up the NR-DC with the SN using an SN addition procedure. The MN CU-CP may establish, based on the SN candidates indicated in the measurement report, the NR-DC for the UE by adding the SN from the SN candidates. Thus, the MN CU-CP may establish, based on the measurement report, the NR-DC for the UE by adding the SN from the SN candidates.

As shown by reference number 116, the UE, the SN, the MN DU, the MN CU-CP, and the MN CU-UP may repeat steps for a next largest downlink buffer size. For example, the MN CU-CP may identify a second UE, of the plurality of UEs, with the next largest downlink buffer size, among the downlink buffer sizes. The MN CU-UP may transmit a request to the MN DU for the second UE to transmit a second measurement report. The second UE with the next largest downlink buffer size may trigger the second measurement report on potential candidates for SN addition (SN candidates), which may be based on the request from the MN DU and the MN CU-CP. The second UE may transmit the second measurement report to the MN DU. The MN CU-CP may request the SN, which may be one of the SN candidates, to report the potential capacity gain of the SN, should the SN be added. The MN CU-CP may transmit the request to the SN via the Xn interface. The SN, based on the request received from the MN CU-CP, may transmit an indication of the potential capacity gain to the MN CU-CP. The MN CU-CP may filter out the SN candidates using the defined signal threshold. The MN CU-CP may sort qualified SN candidates based on reported potential capacity gains. Based on the filtering and sorting, the MN CU-CP may select the SN. The MN CU-CP may set up the NR-DC with the SN, which may correspond to a top-ranked SN candidate with a highest potential capacity gain. The MN CU-CP may set up the NR-DC with the SN using an SN addition procedure. In other words, the MN CU-CP may establish the NR-DC for the second UE based on the SN candidates indicated in the second measurement report.

In some implementations, at a later point in time, the MN CU-CP may transmit a second downlink buffer monitoring request message to the MN CU-UP. The MN CU-UP may transmit, to the MN CU-CP, a second downlink buffer monitoring response message. The second downlink buffer monitoring response message may indicate that, for the UE with the largest downlink buffer size, a downlink buffer no longer exceeds the threshold (e.g., the downlink buffer may not exceed the threshold for a certain period of time). In this case, the MN CU-CP may eliminate NR-DC based on an SN removal procedure. In other words, the MN CU-CP may stop the NR-DC for the UE by removing the SN, where the SN may be removed based on the downlink buffer associated with the UE no longer exceeding the threshold.

As indicated above, FIG. 1 is provided as an example. Other examples may differ from what is described with regard to FIG. 1.

Figure 2:
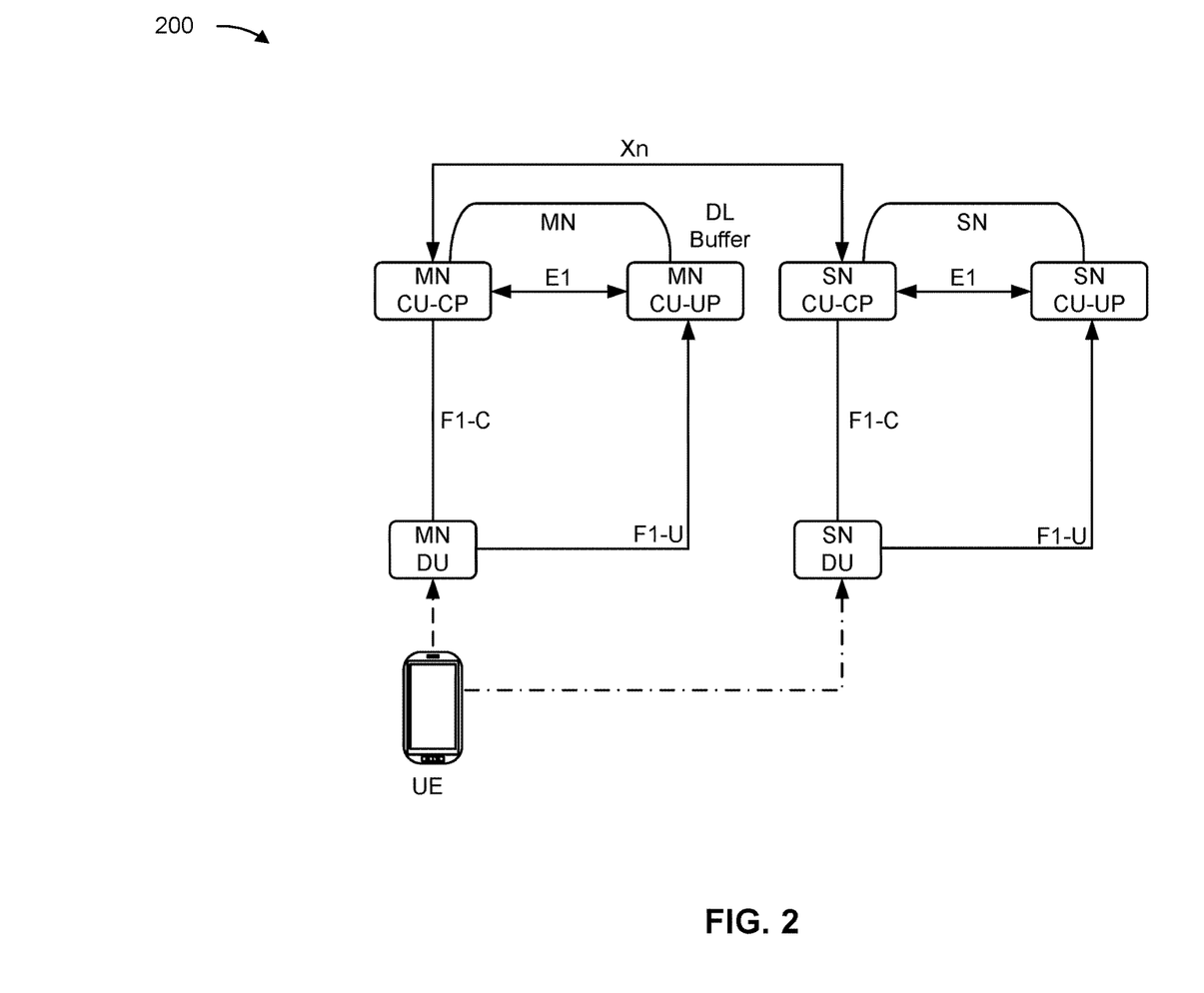
FIG. 2 is a diagram of an example associated with a buffer-based NR-DC setup.

FIG. 2 is a diagram of an example 200 associated with a buffer-based NR-DC setup. As shown in FIG. 2, example 200 includes a UE (e.g., UE 505), an MN (e.g., MN 510), and an SN (e.g., SN 530). The MN may include an MN DU (e.g., DU 515), an MN CU-CP (e.g., CU-CP 520), and an MN CU-UP (e.g., CU-UP 525). The SN may include an SN DU (e.g., DU 535), an SN CU-CP (e.g., CU-CP 540), and an SN CU-UP (e.g., CU-UP 545).

As shown in FIG. 2, the MN may include the MN DU, the MN CU-CP, and the MN CU-UP. The MN CU-CP and the MN CU-UP may communicate with each other via an interface (e.g., an E1 interface). A downlink buffer may be associated with the MN CU-UP. The MN CU-CP and the MN DU may communicate with each other via an interface such as for example, a F1-C interface. The MN CU-UP and the MN DU may communicate with each other via an F1-U interface or any other acceptable interface. The SN CU-CP and the SN CU-UP may communicate with each other via an interface (e.g., an E1 interface). The SN CU-CP and the SN DU may communicate with each other via an interface (e.g., an F1-C interface). The SN CU-UP and the SN DU may communicate with each other via an interface (e.g., an F1-U interface). The MN and the SN may communicate via an interface (e.g., an Xn interface).

As indicated above, FIG. 2 is provided as an example. Other examples may differ from what is described with regard to FIG. 2.

Figure 3:
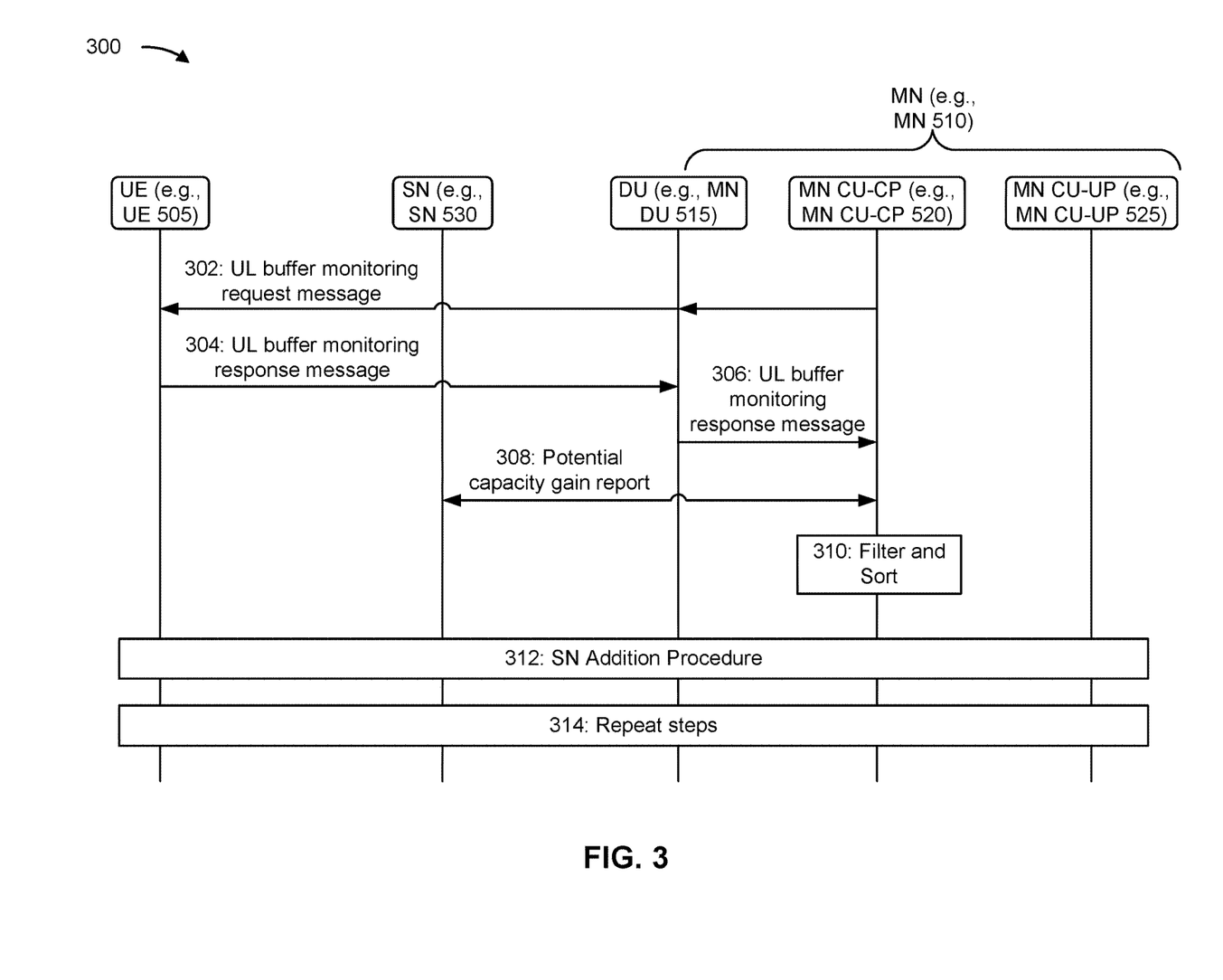
FIG. 3 is a diagram of an example associated with a buffer-based NR-DC setup.

FIG. 3 is a diagram of an example 300 associated with a buffer-based NR-DC setup. As shown in FIG. 3, example 300 includes a UE (e.g., UE 505), an MN (e.g., MN 510), and an SN (e.g., SN 530). The MN may include an MN DU (e.g., MN DU 515), an MN CU-CP (e.g., MN CU-CP 520), and an MN CU-UP (e.g., MN CU-UP 525).

In some implementations, an uplink-buffer-based NR-DC setup may be supported, which may involve an air interface and NG and RAN interfaces, such as Xn, F1, and E1 interfaces. For the uplink-buffer-based NR-DC setup, an uplink buffer may reside in the UE.

As shown by reference number 302, the MN CU-CP may transmit an uplink buffer monitoring request message to the MN DU via an F1 interface. The MN DU may forward the uplink buffer monitoring request message to the UE. For example, the MN CU-CP may transmit the uplink buffer monitoring request message to request the MN DU to reach its connected standalone UEs (without NR-DC), so that the MN DU may start monitoring an uplink buffer status of DRBs. In other words, the uplink buffer monitoring request message may indicate the request for the monitoring of the uplink buffer status of one or more DRBs, and the monitoring may be without the NR-DC. The uplink buffer monitoring request message may indicate various parameters, such as an uplink buffer threshold, a TTT (or TTT timer or threshold time), and/or a periodic/trigger-based response request.

As shown by reference number 304, the UE may transmit, to the MN DU, an uplink buffer monitoring response message. The UE may respond to the MN DU as configured (periodically or trigger-based) with the uplink buffer monitoring response message to acknowledge the uplink buffer monitoring request message, and then the UE may start to monitor NR-DC candidates. The uplink buffer monitoring response message may indicate a DRB whose uplink buffer has exceeded a data threshold for a time longer than TTT, along with an uplink buffer size. The DRB with the uplink buffer may be associated with the UE. In other words, the UE may indicate whether its uplink buffer has exceeded the data threshold for the time longer than TTT. The uplink buffer monitoring response message may also indicate a measurement report on potential candidates for SN addition (SN candidates). The measurement report may be based on the monitored NR-DC candidates.

In some cases, multiple UEs may transmit uplink buffer monitoring response messages to the MN DU, where each uplink buffer monitoring response message may indicate whether a DRB has an uplink buffer that has exceeded the data threshold for the time longer than TTT. In other words, each UE may indicate whether its respective buffer has exceeded the data threshold for the time longer than TTT.

As shown by reference number 306, the MN DU may forward the uplink buffer monitoring response message to the MN CU-CP via an interface such as an F1 interface after receiving the uplink buffer monitoring response message from the UE. The MN CU-CP may receive, from the MN DU, the uplink buffer monitoring response message. The uplink buffer monitoring response message may indicate, for the UE, the DRB having the uplink buffer that exceeds the data threshold for the time longer than the TTT. The uplink buffer monitoring response message may indicate the uplink buffer size. The uplink buffer monitoring response message may indicate the measurement report associated with the SN candidates for the SN addition.

As shown by reference number 308, the MN CU-CP may rank the UE based on the uplink buffer size associated with the UE, as indicated by the uplink buffer monitoring response message. The MN CU-CP may prioritize the UE when the UE has a largest uplink buffer size, among a plurality of UEs. In other words, the MN CU-CP may rank the UE, among the plurality of UEs, based on the UE being associated with the largest uplink buffer size among the plurality of UEs. The MN CU-CP may request the SN, which may be one of the SN candidates of the top-ranked UE, to report their potential capacity gain, should the SN be added. The MN CU-UP may transmit the request to the SN via an Xn interface. In other words, the MN CU-UP may transmit, to the SN candidates, a request for a report regarding a potential capacity gain resulting from adding the SN candidates. The SN, based on the request received from the MN CU-CP, may transmit an indication of the potential capacity gain to the MN CU-CP.

As shown by reference number 310, the MN CU-CP may filter out the SN candidates using a defined signal threshold. The MN CU-CP may sort qualified SN candidates based on reported potential capacity gains. Based on the filtering and sorting, the MN CU-CP may select the SN. In other words, the MN CU-CP may select the SN from the SN candidates based on the potential capacity gain associated with the SN, where the SN may be a top-ranked SN from the SN candidates in terms of potential capacity gain.

As shown by reference number 312, the MN CU-CP may set up the NR-DC with the SN, which may correspond to the top-ranked SN candidate with a highest potential capacity gain. The MN CU-CP may set up the NR-DC with the SN using an SN addition procedure. The MN CU-CP may establish, based on the uplink buffer monitoring response message that indicates the measurement report of the SN candidates, the NR-DC for the UE by adding the SN from the SN candidates. Thus, the MN CU-CP may establish, based on the uplink buffer monitoring response message, the NR-DC for the UE by adding the SN from the SN candidates.

As shown by reference number 314, the UE, the SN, the MN DU, the MN CU-CP, and the MN CU-UP may repeat steps for a second UE with a next largest uplink buffer size, which may be indicated by the uplink buffer monitoring response message. The uplink buffer monitoring response message may indicate, for the second UE, a DRB having an uplink buffer that exceeds the data threshold for the time longer than the TTT. The MN CU-CP may rank the second UE with the next largest uplink buffer size. The MN CU-CP may prioritize the second UE when the second UE has the next largest uplink buffer size, among the plurality of UEs. The MN CU-CP may request the SN, which may be one of the SN candidates of the second UE, to report their potential capacity gain, should the SN be added. The MN CU-UP may transmit the request to the SN via the Xn interface. The MN CU-CP may filter out the SN candidates using the defined signal threshold. The MN CU-CP may sort qualified SN candidates based on reported potential capacity gains. Based on the filtering and sorting, the MN CU-CP may select the SN. The MN CU-CP may set up the NR-DC with the SN, which may correspond to a top-ranked SN candidate with a highest potential capacity gain. The MN CU-CP may set up the NR-DC with the SN for the second UE using an SN addition procedure.

In some implementations, at a later point in time, the MN CU-CP may transmit a second uplink buffer monitoring request message. The MN DU may receive a second uplink buffer monitoring response message. The second uplink buffer monitoring response message may indicate that, for the UE with the largest uplink buffer size, an uplink buffer no longer exceeds the threshold (e.g., the uplink buffer may not exceed the threshold for a certain period of time). In this case, the MN CU-CP may eliminate NR-DC based on an SN removal procedure. In other words, the MN CU-CP may stop the NR-DC for the UE by removing the SN, where the SN may be removed based on the uplink buffer associated with the UE no longer exceeding the threshold.

As indicated above, FIG. 3 is provided as an example. Other examples may differ from what is described with regard to FIG. 3.

Figure 4:
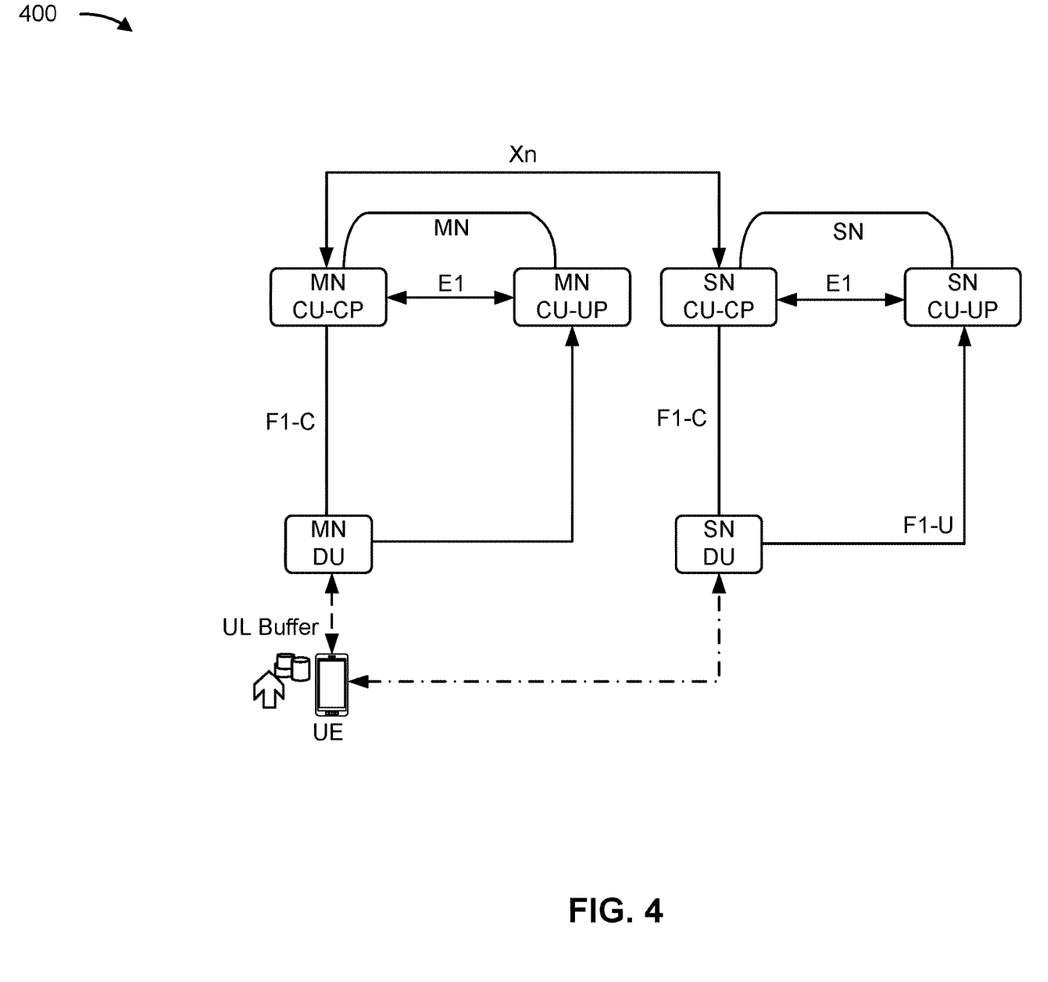
FIG. 4 is a diagram of an example associated with a buffer-based NR-DC setup.

FIG. 4 is a diagram of an example 400 associated with a buffer-based NR-DC setup. As shown in FIG. 4, example 400 includes a UE (e.g., UE 505), an MN (e.g., MN 510), and an SN (e.g., SN 530). The MN may include an MN DU (e.g., DU 515), an MN CU-CP (e.g., CU-CP 520), and an MN CU-UP (e.g., CU-UP 525). The SN may include an SN DU (e.g., DU 535), an SN CU-CP (e.g., CU-CP 540), and an SN CU-UP (e.g., CU-UP 545).

As shown in FIG. 4, the MN may include the MN DU, the MN CU-CP, and the MN CU-UP. An uplink buffer may be associated with the UE, as opposed to a downlink buffer being associated with the MN CU-UP (as shown in FIG. 2).

As indicated above, FIG. 4 is provided as an example. Other examples may differ from what is described with regard to FIG. 4.

Figure 5:
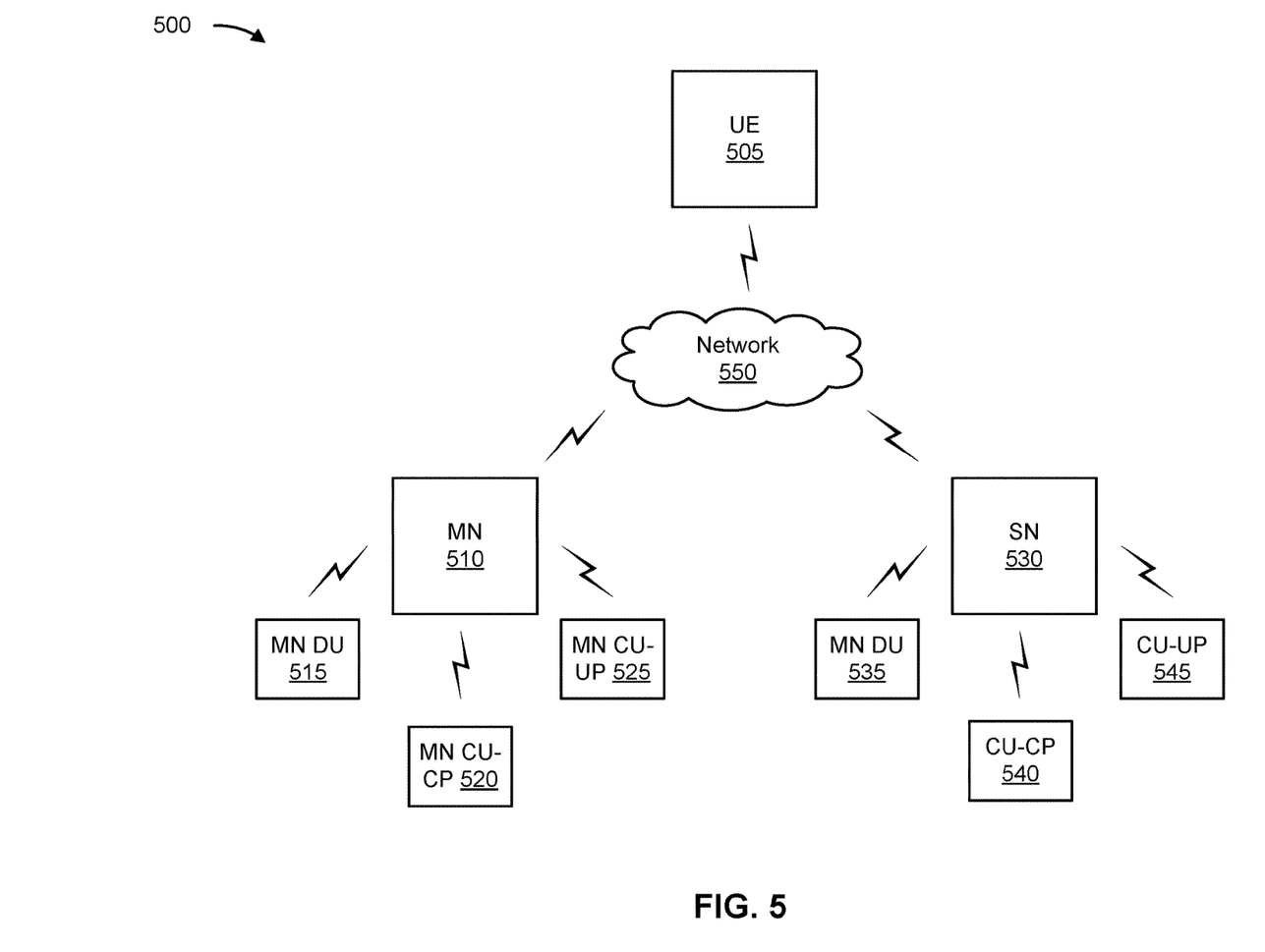
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a UE 505, an MN 510, an SN 530, and a network 550. Devices of environment 500 may interconnect via wired connections, wireless connections, or a combination of wired and wireless connections.

The UE 505 may include one or more devices capable of receiving, generating, storing, processing, and/or providing information associated with a buffer-based NR-DC setup, as described elsewhere herein. The UE 505 may include a communication device and/or a computing device. For example, the UE 505 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a smart television, an Internet of Things (IoT) device, or a similar type of device.

The MN 510 may include one or more devices capable of receiving, processing, storing, routing, and/or providing information associated with a buffer-based NR-DC setup, as described elsewhere herein. The MN 510 may include an MN DU 515, an MN CU-CP 520, and an MN CU-UP 525. The MN 510 may be configured to communicate with the UE 505. The MN 510 may be an aggregated network node, meaning that the aggregated network node is configured to utilize a radio protocol stack that is physically or logically integrated within a single RAN node (e.g., within a single device or unit). The MN 510 may be a disaggregated network node (sometimes referred to as a disaggregated base station), meaning that the MN 510 is configured to utilize a protocol stack that is physically or logically distributed among two or more nodes (such as one or more CUs, one or more DUs, or one or more radio units (RUs)). The MN 510 may include, for example, an NR base station, a long-term evolution (LTE) base station, a Node B, an eNB (e.g., in 4G), a gNB (e.g., in 5G), an access point, a transmission reception point (TRP), a DU, an RU, a CU, a mobility element of a network, a core network node, a network element, a network equipment, and/or a RAN node.

The SN 530 may include one or more devices capable of receiving, processing, storing, routing, and/or providing information associated with a buffer-based NR-DC setup, as described elsewhere herein. The SN 530 may include an SN DU 535, an SN CU-CP 540, and an SN CU-UP 545. The SN 530 may be configured to communicate with the UE 505. The SN 530 may be an aggregated network node, meaning that the aggregated network node is configured to utilize a radio protocol stack that is physically or logically integrated within a single RAN node (e.g., within a single device or unit). The SN 530 may be a disaggregated network node (sometimes referred to as a disaggregated base station), meaning that the SN 530 is configured to utilize a protocol stack that is physically or logically distributed among two or more nodes (such as one or more CUs, one or more DUs, or one or more RUs). The MN 510 may include, for example, an NR base station, an LTE base station, a Node B, an eNB (e.g., in 4G), a gNB (e.g., in 5G), an access point, a TRP, a DU, an RU, a CU, a mobility element of a network, a core network node, a network element, a network equipment, and/or a RAN node.

The network 550 may include one or more wired and/or wireless networks. For example, the network 540 550 include a cellular network (e.g., a 5G network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 550 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
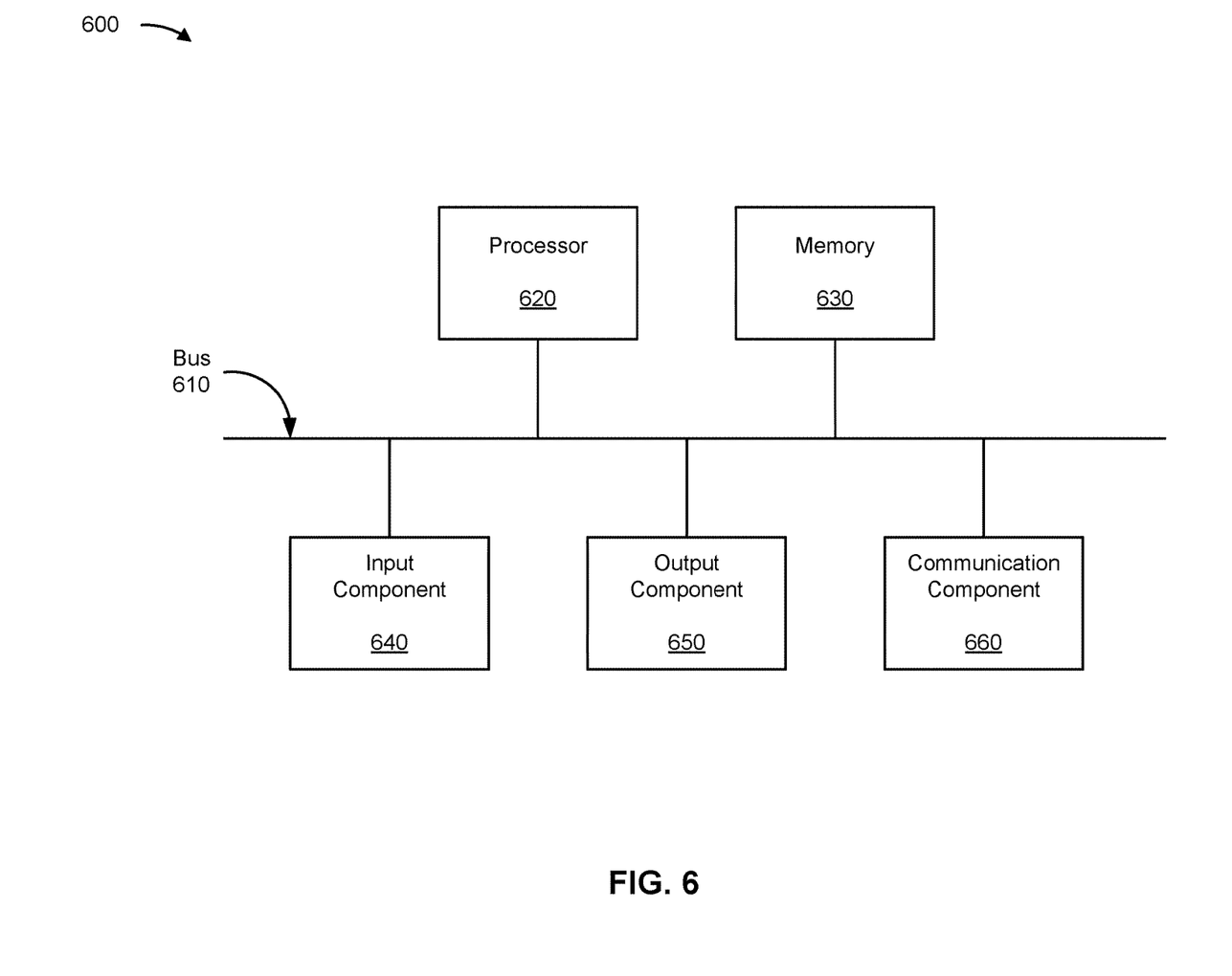
FIG. 6 is a diagram of example components of one or more devices of FIG. 5.

FIG. 6 is a diagram of example components of a device 600 associated with a buffer-based NR-DC setup. The device 600 may correspond to a UE (e.g., UE 505), an MN (e.g., MN 510), and/or an SN (e.g., SN 530). In some implementations, the UE, the MN, and/or the SN may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
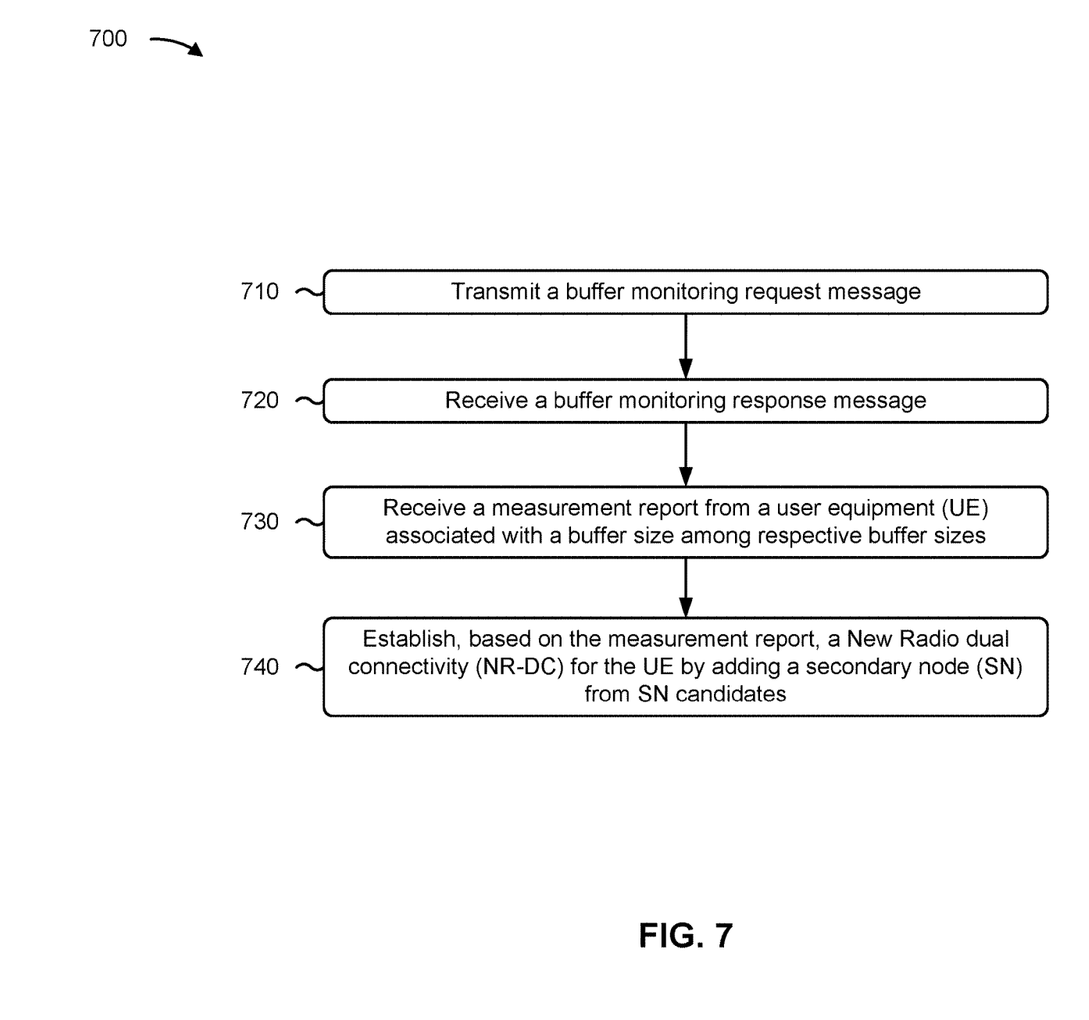
FIG. 7 is a flowchart of an example process associated with a buffer-based NR-DC setup.

FIG. 7 is a flowchart of an example process 700 associated with a buffer-based NR-DC setup. In some implementations, one or more process blocks of FIG. 7 may be performed by an MN (e.g., MN 510). In some implementations, one or more process blocks of FIG. 7 may be performed by another device or a group of devices separate from or including the MN, such as a UE (e.g., UE 505) and/or an SN (e.g., SN 530). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include transmitting a buffer monitoring request message, wherein the buffer monitoring request message indicates a threshold time, such as a TTT (block 710). In some implementations, process 700 may include transmitting, by an MN CU-CP to an MN CU-UP, the downlink buffer monitoring request message, where the downlink buffer monitoring request message may indicate the threshold time. The downlink buffer monitoring request message may indicate a request for a monitoring of a downlink buffer status of the one or more DRBs, and the monitoring may be without an NR-DC. The downlink buffer monitoring request message may indicate a downlink buffer threshold and a periodic or trigger-based response request. In some implementations, process 700 may include transmitting, by the MN CU-CP and to an MN DU, an uplink buffer monitoring request message, where the uplink buffer monitoring request message may indicate the threshold time. The uplink buffer monitoring request message may indicate a request for a monitoring of an uplink buffer status of the DRB, and the monitoring may be without the NR-DC. The uplink buffer monitoring request message may indicate an uplink buffer threshold and a periodic or trigger-based response request.

As further shown in FIG. 7, process 700 may include receiving a buffer monitoring response message, wherein the buffer monitoring response message indicates one or more DRBs having buffers that exceed a data threshold for a time longer than the threshold time, and wherein the buffer monitoring response message indicates respective buffer sizes (block 720). The buffers may include one of downlink buffers or uplink buffers. A buffer status may be an indication of a potential upcoming QoE deterioration, where the potential upcoming QoE deterioration may be related to a delay longer than allowed in a QoS policy. In some implementations, process 700 may include receiving, by the MN CU-CP and from the MN CU-UP, the downlink buffer monitoring response message, where the downlink buffer monitoring response message may indicate one or more DRBs having downlink buffers that exceed a data threshold for a time longer than the threshold time, and the downlink buffer monitoring response message may indicate respective downlink buffer sizes of the downlink buffers. In some implementations, process 700 may include receiving, by the MN CU-CP and from the MN DU, the uplink buffer monitoring response message, where the uplink buffer monitoring response message may indicate, for a UE, a DRB having an uplink buffer that exceeds a data threshold for a time longer than the threshold time, where the uplink buffer monitoring response message may indicate a corresponding uplink buffer size, and the uplink buffer monitoring response message may indicate a measurement report associated with SN candidates for an SN addition.

As further shown in FIG. 7, process 700 may include receiving a measurement report of a UE associated with a buffer size (e.g., a largest buffer size) among the respective buffer sizes, wherein the measurement report is associated with SN candidates for an SN addition (block 730). In some implementations, process 700 may include ranking, by the MN CU-CP, the UE, among a plurality of UEs, based on the UE being associated with the largest downlink buffer size among the respective downlink buffer sizes, where the request for the measurement report may be transmitted to the UE based on the ranking of the UE. In some implementations, process 700 may include ranking, by the MN CU-CP, the UE, among the plurality of UEs, based on the UE being associated with a largest uplink buffer size among the plurality of UEs. In some implementations, process 700 may include transmitting, by the MN CU-CP and to the SN candidates, a request for a report regarding a potential capacity gain resulting from adding the SN candidates. Process 700 may include selecting, by the MN CU-CP, the SN from the SN candidates based on the potential capacity gain associated with the SN, where the SN may be a top-ranked SN from the SN candidates in terms of potential capacity gain.

As further shown in FIG. 7, process 700 may include establishing, based on the measurement report, an NR-DC for the UE by adding an SN from the SN candidates (block 740). In some implementations, process 700 may include establishing, by the MN CU-CP and based on the measurement report, the NR-DC for the UE by adding the SN from the SN candidates. In some implementations, process 700 may include establishing, by the MN CU-CP and based on the uplink buffer monitoring response message, the NR-DC for the UE by adding the SN from the SN candidates.

In some implementations, the UE may be a first UE and the measurement report may be a first measurement report, and the process 700 may include transmitting, by the MN CU-CP to the MN DU, a request for a second measurement report of a second UE associated with a next largest downlink buffer size among the respective downlink buffer sizes. Process 700 may include receiving, by the MN CU-CP and from the second UE, the second measurement report. Process 700 may include establishing, by the MN CU-CP and based on the second measurement report, an NR-DC for the second UE.

In some implementations, the UE may be a first UE, the uplink buffer monitoring response message may indicate, for a second UE, a DRB having an uplink buffer that exceeds the data threshold for the time longer than the threshold time, and the second UE may be associated with a next largest uplink buffer size among a plurality of UEs, and process 700 may include establishing, by the MN CU-CP, an NR-DC for the second UE.

In some implementations, process 700 may include stopping, by the MN CU-CP, the NR-DC for the UE by removing the SN, where the SN may be removed based on a downlink buffer associated with the UE no longer exceeding the threshold. In some implementations, process 700 may include stopping, by the MN CU-CP, the NR-DC for the UE by removing the SN, where the SN may be removed based on an uplink buffer associated with the UE no longer exceeding the threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a master node (MN), comprising:
    transmitting, by a master node central unit control plane (MN CU-CP) to a master node central unit user plane (MN CU-UP), a downlink buffer monitoring request message, wherein the downlink buffer monitoring request message indicates a threshold time;
    receiving, by the MN CU-CP and from the MN CU-UP, a downlink buffer monitoring response message, wherein the downlink buffer monitoring response message indicates one or more data radio bearers (DRBs) having downlink buffers that exceed a data threshold by the threshold time, and wherein the downlink buffer monitoring response message indicates respective downlink buffer sizes of the downlink buffers;
    receiving, by the MN CU-CP, and via a master node distributed unit (MN DU), a measurement report of a user equipment (UE) associated with a downlink buffer size among the respective downlink buffer sizes, wherein the measurement report is associated with secondary node (SN) candidates; and
    establishing, by the MN CU-CP and based on the measurement report, a New Radio dual connectivity (NR-DC) for the UE by adding an SN from the SN candidates.

2. The method of claim 1, wherein the downlink buffer monitoring request message indicates a request for a monitoring of a downlink buffer status of the one or more DRBs, and the monitoring is without the NR-DC.

3. The method of claim 1, wherein the downlink buffer monitoring request message indicates a downlink buffer threshold and a periodic or trigger-based response request.

4. The method of claim 1, further comprising:
    ranking, by the MN CU-CP, the UE, among a plurality of UEs, based on the UE being associated with a largest downlink buffer size among the respective downlink buffer sizes, wherein a request for the measurement report is transmitted to the UE based on the ranking of the UE.

5. The method of claim 1, further comprising:
    transmitting, by the MN CU-CP and to the SN candidates, a request for a report regarding a potential capacity gain resulting from adding the SN candidates; and
    selecting, by the MN CU-CP, the SN from the SN candidates based on the potential capacity gain associated with the SN, wherein the SN is a top-ranked SN from the SN candidates in terms of potential capacity gain.

6. The method of claim 1, wherein the UE is a first UE and the measurement report is a first measurement report, and further comprising:
    transmitting, by the MN CU-CP to the MN DU, a request for the first measurement report of the first UE associated with a largest downlink buffer size among the respective downlink buffer sizes; and
    transmitting, by the MN CU-CP to the MN DU, a request for a second measurement report of a second UE associated with a next largest downlink buffer size among the respective downlink buffer sizes;
    receiving, by the MN CU-CP and from the second UE, the second measurement report; and
    establishing, by the MN CU-CP and based on the second measurement report, an NR-DC for the second UE.

7. The method of claim 1, further comprising:
    stopping, by the MN CU-CP, the NR-DC for the UE by removing the SN, wherein the SN is removed based on a downlink buffer associated with the UE no longer exceeding the threshold.

8. The method of claim 1, wherein a downlink buffer is associated with the MN CU-UP.

9. A method performed by a master node (MN), comprising:
    transmitting, by a master node central unit control plane (MN CU-CP) and to a master node distributed unit (MN DU), an uplink buffer monitoring request message, wherein the uplink buffer monitoring request message indicates a threshold time;
    receiving, by the MN CU-CP and from the MN DU, an uplink buffer monitoring response message, wherein the uplink buffer monitoring response message indicates, for a user equipment (UE), a data radio bearer (DRB) having an uplink buffer that exceeds a data threshold for a time longer than the threshold time, wherein the uplink buffer monitoring response message indicates a corresponding uplink buffer size, and wherein the uplink buffer monitoring response message indicates a measurement report of the UE associated with secondary node (SN) candidates; and establishing, by the MN CU-CP and based on the uplink buffer monitoring response message, a New Radio dual connectivity (NR-DC) for the UE by adding an SN from the SN candidates.

10. The method of claim 9, wherein the uplink buffer monitoring request message indicates a request for a monitoring of an uplink buffer status of the DRB, and the monitoring is without the NR-DC.

11. The method of claim 9, wherein the uplink buffer monitoring request message indicates an uplink buffer threshold and a periodic or trigger-based response request.

12. The method of claim 9, further comprising:
ranking, by the MN CU-CP, the UE, among a plurality of UEs, based on the UE being associated with a largest uplink buffer size among the plurality of UEs.

13. The method of claim 9, further comprising:
transmitting, by the MN CU-CP and to the SN candidates, a request for a report regarding a potential capacity gain resulting from adding the SN candidates; and
selecting, by the MN CU-CP, the SN from the SN candidates based on the potential capacity gain associated with the SN, wherein the SN is a top-ranked SN from the SN candidates in terms of potential capacity gain.

14. The method of claim 9, wherein the UE is a first UE, wherein the uplink buffer monitoring response message indicates, for a second UE, a DRB having an uplink buffer that exceeds the data threshold for the time longer than the threshold time, and wherein the second UE is associated with a next largest uplink buffer size among a plurality of UEs, and further comprising:
establishing, by the MN CU-CP, an NR-DC for the second UE.

15. The method of claim 9, further comprising:
stopping, by the MN CU-CP, the NR-DC for the UE by removing the SN, wherein the SN is removed based on an uplink buffer associated with the UE no longer exceeding the threshold.

16. The method of claim 9, wherein an uplink buffer is associated with the UE.

17. A device, comprising:
one or more processors coupled to a memory storing instructions, configured to:
transmit, by the device, a buffer monitoring request message, wherein the buffer monitoring request message indicates a threshold time;
receive, by the device, a buffer monitoring response message, wherein the buffer monitoring response message indicates one or more data radio bearers (DRBs) having buffers that exceed a data threshold for a time longer than the threshold time, and wherein the buffer monitoring response message indicates respective buffer sizes;
receive, by the device, a measurement report of a user equipment (UE) associated with a buffer size among the respective buffer sizes, wherein the measurement report is associated with secondary node (SN) candidates; and
establish, by the device and based on the measurement report, a New Radio dual connectivity (NR-DC) for the UE by adding an SN from the SN candidates.

18. The device of claim 17, wherein a buffer status is an indication of a potential upcoming quality of experience (QoE) deterioration, wherein the potential upcoming QoE deterioration is related to a delay longer than allowed in a quality of service (QOS) policy.

19. The device of claim 17, wherein the buffers include one of downlink buffers or uplink buffers.

20. The device of claim 17, wherein the device is a master node (MN).

\* \* \* \* \*